United States Patent
Young

(10) Patent No.: US 12,360,403 B1
(45) Date of Patent: Jul. 15, 2025

(54) CUSTOM ASSEMBLIES FOR HEAD-MOUNTABLE DEVICES

(71) Applicant: Apple Inc., Cupertino, CA (US)

(72) Inventor: Austin S. Young, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 17/721,080

(22) Filed: Apr. 14, 2022

Related U.S. Application Data

(60) Provisional application No. 63/191,266, filed on May 20, 2021.

(51) Int. Cl.
| | |
|---|---|
| *G06T 11/00* | (2006.01) |
| *G02B 27/01* | (2006.01) |
| *G02C 9/00* | (2006.01) |
| *G02C 13/00* | (2006.01) |
| *G06F 3/01* | (2006.01) |
| *G06V 40/16* | (2022.01) |

(52) U.S. Cl.
CPC ....... *G02C 13/003* (2013.01); *G02B 27/0172* (2013.01); *G02B 27/0176* (2013.01); *G02C 9/00* (2013.01); *G06F 3/012* (2013.01); *G06T 11/00* (2013.01); *G06V 40/165* (2022.01); *G06V 40/171* (2022.01); *G02B 2027/0178* (2013.01); *G06T 2200/24* (2013.01)

(58) Field of Classification Search
CPC ...... G02C 13/003; G02C 9/00; G06V 40/171; G06V 40/165; G02B 27/0172; G02B 27/0176; G02B 2027/0178; G06F 3/012; G06T 11/00; G06T 2200/24

USPC .......................................................... 345/630
See application file for complete search history.

(56) References Cited

U.S. PATENT DOCUMENTS

| | | | |
|---|---|---|---|
| 9,619,201 B2 | 4/2017 | Jannard et al. | |
| 10,739,600 B1* | 8/2020 | Yee | G02B 27/0176 |
| 2013/0321925 A1* | 12/2013 | Jacobs | G02B 27/0176 29/428 |
| 2015/0029088 A1* | 1/2015 | Kim | G02B 27/017 345/156 |
| 2015/0268475 A1* | 9/2015 | Lee | G02B 27/0176 345/8 |
| 2020/0201042 A1* | 6/2020 | Wang | G02B 27/0149 |

FOREIGN PATENT DOCUMENTS

| | | |
|---|---|---|
| CN | 206039073 | 3/2017 |

* cited by examiner

*Primary Examiner* — Hai Tao Sun
(74) *Attorney, Agent, or Firm* — BAKERHOSTETLER

(57) ABSTRACT

A head-mountable device can include custom components that are assembled onto core components to provide custom fit capabilities when assembled together. By detecting head features of a user, a custom assembly for a head-mountable device can be determined to achieve a preferred fit. The custom assembly can be based on a predetermined base design and augmentations that will allow the user to operate the elements of the base design while also enjoying a preferred fit. For example, a core component holding certain components (e.g., electric components) in fixed relative positions can be augmented with an enclosure and/or fitting components to accommodate the head features of a given user.

20 Claims, 10 Drawing Sheets

ABSTRACT# CUSTOM ASSEMBLIES FOR HEAD-MOUNTABLE DEVICES

CROSS-REFERENCE TO RELATED APPLICATION

This application claims the benefit of U.S. Provisional Application No. 63/191,266, entitled "CUSTOM ASSEMBLIES FOR HEAD-MOUNTABLE DEVICES," filed May 20, 2021, the entirety of which is incorporated herein by reference.

TECHNICAL FIELD

The present description relates generally to head-mountable devices, and, more particularly, to custom assemblies for head-mountable devices, such as eyeglasses.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
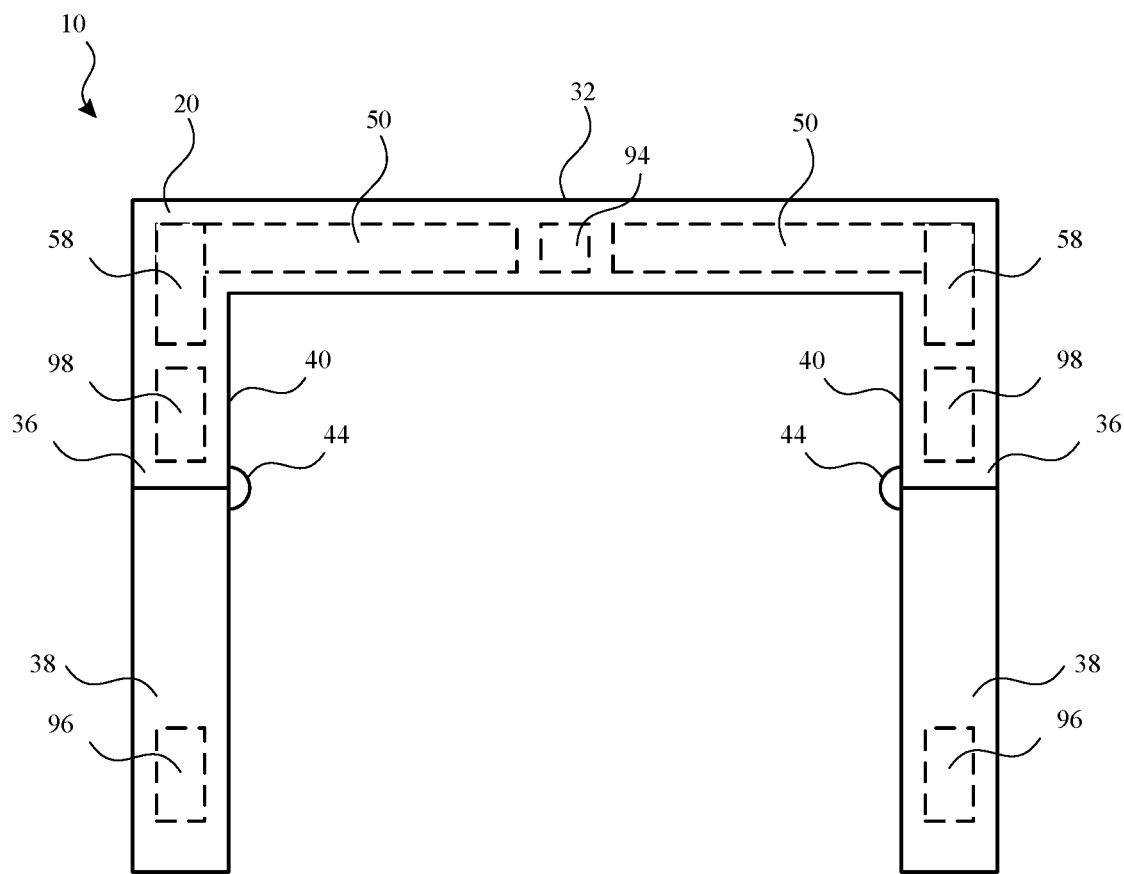
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices, such as head-mounted displays, headsets, visors, smartglasses, head-up display, etc., can perform a range of functions that are managed by the components (e.g., sensors, circuitry, and other hardware) included with the wearable device. Interactive systems including head-mounted devices can include multiple parts, such as a head-mounted device that supports an electronic device. The head-mounted device and/or the electronic device can provide the user with outputs such as audio and visual information. The head-mounted device and/or the electronic device can also receive inputs from a user.

Many of the functions performed by a head-mountable device are optimally experienced when the components are in their most preferred position and orientation with respect to a user wearing the head-mountable device. For example, the head-mountable device can include a display element that visually outputs display-based information toward the eyes of the user. The position and orientation of the display elements relative to the eyes depends, at least in part, on how the head-mountable device is positioned on the face of the user. Due to variations in facial features across different users, a given head-mountable device may require a particular arrangement to accommodate an individual user. For example, different users can have different facial features (e.g., face plane slope, forehead size, eye location, nose geometry, ear geometry, etc.). Accordingly, different users may perceive the displayed information differently unless a preferred arrangement is provided. Similarly, different users may perceive the audio output differently due to variations in ear (tragion) and nose anchoring points.

It can be expensive to offer a broad range of head-mountable devices with many variations of size and shape between each. It can also be expensive to provide to each user a head-mountable device that is entirely customized. It can be desirable to provide to each individual user a head-mountable device that has a custom arrangement of parts to fit the user's features based on a limited number of base designs.

Systems of the present disclosure can provide a head-mountable device with custom parts that are assembled onto core components to provide custom fit capabilities when assembled together. By detecting head features of a user, a custom assembly for a head-mountable device can be determined to achieve a preferred fit. The custom assembly can be based on a predetermined base design and augmentations that will allow the user to operate the elements of the base design while also enjoying a preferred fit. For example, a core component holding certain components (e.g., electric components) in fixed relative positions can be augmented with an enclosure and/or fitting components to accommodate the head features of a given user.

These and other embodiments are discussed below with reference to FIGS. 1-16. However, those skilled in the art will readily appreciate that the detailed description given herein with respect to these Figures is for explanatory purposes only and should not be construed as limiting.

Figure 2:
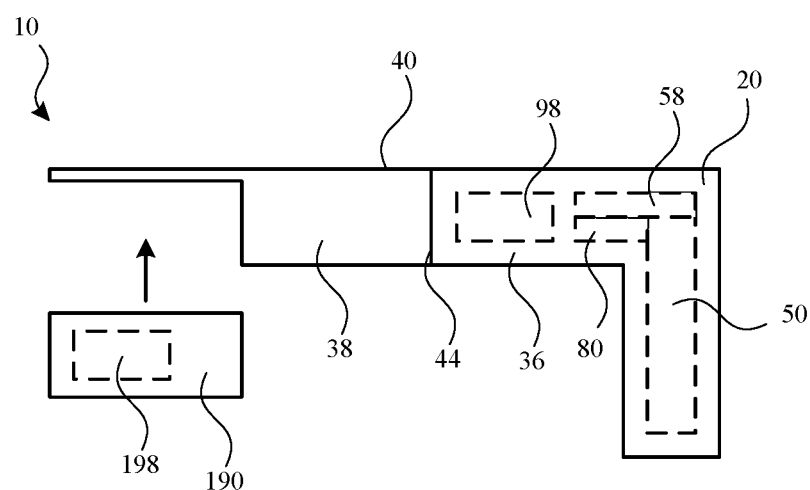
FIG. 2 illustrates a side view of the head-mountable device of FIG. 1, according to some embodiments of the present disclosure.

According to some embodiments, for example as shown in FIGS. 1 and 2, a head-mountable device 10 includes a frame 20 that is worn on a head with one or more arms 40. The frame 20 can be positioned in front of the eyes of a user to provide information within a field of view of the user. The frame 20 can provide nose pads or another feature to rest on a user's nose. The frame 20 further includes one or more optical modules 50 and a bridge 32 above the nose pads and connecting multiple optical modules 50.

The frame 20 and/or the arms 40 can serve to surround a peripheral region of the head-mountable device 10 as well as support any internal components in their assembled position. For example, the frame 20 and/or the arms 40 can enclose and support various internal components (including for example integrated circuit chips, processors, sensors, input/output devices, memory devices, and other circuitry) to provide computing and functional operations for the head-mountable device 10, as discussed further herein.

An optical module 50 can transmit light from a physical environment for viewing by the user. Such an optical module 50 can include optical properties, such lenses for vision correction based on incoming light from the physical environment. Additionally or alternatively, an optical module 50 can provide information as a display within a field of view of the user. Such information can be displayed based on operation of a display element 80 that projects light onto and/or communicates with one or more elements of the optical module 50. As shown in FIGS. 1 and 2, the display element 80 can reside, at least partially, in one or more of the arms 40 and/or in the frame 20. For example, the display element 80 can reside, at least partially, within a cavity extending from the frame 20 and into the arm 40. Displayed information can be provided to the exclusion of a view of a physical environment or in addition to (e.g., overlaid with) a physical environment.

Referring again to FIGS. 1 and 2, a frame 20 can be supported on a user's head with the arms 40. The arms 40 can wrap or extend along opposing sides of a user's head, as with temple components 36. The arms 40 can further include ear components 38 for wrapping around or otherwise engaging a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, an arm can extend about a user's head to both sides of the frame 20.

The frame 20 can be coupled to or integral (e.g., monolithic) with one or more of the arms 40, including the temple components 36 and/or the ear components 38. For example, a continuous support structure including the frame 20 can support the optical modules 50 as well as the display elements 80. While at least a portion of the arms 40 can optionally move (e.g., the ear components 38 pivot about a hinge 44 and relative to the temple components 36) with respect to the frame 20, it will be understood that, in at least some embodiments, the frame 20 and/or the arms 40 can form a continuous structure that supports both the optical modules 50 as well as the display elements 80 to facilitate relative alignment of the optical modules 50 and their corresponding display element 80. As such, the arms 40 can refer to at least a portion of the support structure (e.g., temple components 36) that extends away from the portion of the frame 20 and that supports the optical modules 50.

In some embodiments, each of the optical modules 50 can include the display element 80 (e.g., a light projector) and a waveguide. The display element 80 can include any and all components for projecting light in the desired manner. For example, the display element 80 can include light sources, such as an RGB module, polarizers, beam splitters, collimators, lenses, and the like. The optical modules 50 can include a waveguide that allows internal reflections of received light, as well as one or more other optical components, such as corrective lenses.

The head-mountable device 10 can include one or more sensors. For example, the head-mountable device 10 can include a camera 58 for capturing a view of an environment external to the head-mountable device 10. The camera 58 can include an optical sensor, such as a photodiode or a photodiode array, a charge-coupled device (CCD) and/or a complementary metal-oxide-semiconductor (CMOS) device, a photovoltaic cell, a photo resistive component, a laser scanner, and the like. The camera 58 may be configured to capture an image of a scene or subject located within a field of view of the camera 58.

By further example, the head-mountable device 10 can include a sensor 94 for detecting one or more properties of a user, the head-mountable device 10, and/or an external environment. The sensor 94 can be or include one or more user sensors for tracking features of the user wearing the head-mountable device 10. For example, a user sensor can perform facial feature detection, facial movement detection, facial recognition, eye tracking, user mood detection, user emotion detection, voice detection, etc. Such eye tracking may be used to determine a location of information to be displayed by the display element 80 and/or a portion (e.g., object) of a view to be analyzed by the head-mountable device 10. By further example, the user sensor can be a bio-sensor for tracking biometric characteristics, such as health and activity metrics.

Additionally or alternatively, the sensor 94 can be or include one or more HMD sensors. Such HMD sensors can include any sensor that detects one or more conditions of the head-mountable device 10. For example, an HMD sensor can include an inertial measurement unit (IMU), a thermal sensor, a magnetometer, a gyroscope, an accelerometer, a global positioning sensor, a tilt sensor, and the like. An HMD sensor can be configured to sense substantially any type of characteristic such as, but not limited to, images, pressure, light, touch, force, temperature, position, motion, and so on. Where applicable, the detected conditions can be correlated to the user when the head-mountable device 10 is worn by the user.

Additionally or alternatively, the sensor 94 can be or include one or more environment sensors that are directed to an external environment. Such environment sensors can include any sensor that detects one or more conditions in an environment of the head-mountable device 10. For example, an environment sensor can include an imaging device, a thermal sensor, a proximity sensor, a motion sensor, a humidity sensor, a chemical sensor, a light sensor, a magnetometer, and/or a UV sensor. An environment sensor can be configured to sense substantially any type of characteristic such as, but not limited to, images, pressure, light, touch, force, temperature, position, motion, and so on.

An example of a sensor 94 is illustrated in FIG. 1 as being positioned at the bridge 32 of the frame 20 (e.g., between the optical modules 50). It will be understood that the sensor 94 and/or other sensors can be positioned at other locations (e.g., the frame 20, the arms 40, etc.) to effectively detect the target property.

By further example, the head-mountable device 10 can include a processor and/or other electronic components 98 for performing one or more processing functions and/or managing other electronic components. Additionally or alternatively, other electronic components 98 can also be provided. While the electronic components 98 are illustrated in the arms 40 of FIGS. 1 and 2, it will be understood that these and/or other components can be positioned at any locations and provided with operative connections. Such components can generate heat while in use, and such heat can be directed outwardly toward the frame 20 and/or the arms 40 to be dissipated to an external environment.

Referring now to FIG. 2, a head-mountable device can be provided with one or more accessory devices for further enhancing functionality of the head-mountable device. For example, an accessory device 190 can be attached and operably connected to an ear component 38. Optionally, the accessory device 190 can be inset within a recess of the ear component 38, such that a portion of the accessory device 190 is flush with a portion of the ear component 38.

It will be understood that the accessory device 190 can be positioned at a location that enhances the comfort of the combined system to the user when worn. For example, the accessory devices 190 can be positioned at a portion of the ear component 38 to conform to an ear and/or head of the user. The accessory device 190 can attach to the head-mountable device 10 with attachment elements, such as locks, latches, snaps, screws, clasps, threads, magnets, pins, an interference (e.g., friction) fit, knurl presses, bayoneting, and/or combinations thereof. Attachment can be achieved with an engagement that holds the accessory device 190 in place relative to the head-mountable device 10 until controlled release, for example by a user.

An electrical or other communication connection can be made and maintained upon mechanical securement of the accessory device 190 and the ear component 38, for example via a communication interface. When the head-mountable device 10 is connected to the accessory device 190, components thereof (e.g., an accessory component 198) can be in operative communication with other components of the head-mountable device 10. The communication interface can facilitate communication (e.g., transfer) of power, data, or other signals between components of the accessory device 190 and the head-mountable device 10.

In some embodiments, the accessory device 190 can operate as a power source for the head-mountable device 10. By providing power with a removable accessory device, the user can select such an accessory device according to anticipated power needs. The accessory component 198 can include a battery that is used to store and provide power to the head-mountable device 10 and/or the accessory device 190. Optionally, the accessory device 190 can recharge the battery of the head-mountable device 10.

Further examples of accessory components 198 include speakers. Such speakers can be operated in concert with or independently of the speakers of the head-mountable device 10. Speakers of the accessory device 190 can be provided and operated at locations that enhance the audio output of the combined system. For example, the speakers of the accessory device 190 can be operated to provide spatial audio to the user.

Further examples of accessory components 198 include cameras, microphones, sensors, components for receiving input from a user, components for providing output to a user, display drivers, and the like. By providing electronic components on a removable accessory device, the user can optionally provide an appropriate accessory device when selected functions are desired. At other times, other accessory devices or no accessory device can be selected, thereby reducing the need to have all features available at all times in the head-mountable device 10.

Multiple accessory devices can have other features that are similar or the same among the multiple accessory devices. For example, the multiple accessory devices can include enclosures that have the same or similar size, shape, profile, dimension, aspect ratio, surface feature, texture, color, and/or markings. The common features allow a user to exchange the accessory devices with each other while maintaining a consistent user experience across the different accessory devices when used at different times.

Additionally or alternatively, at least one of the size, shape, profile, dimension, aspect ratio, surface feature, texture, color, and/or markings can be different among multiple accessory devices. For example, different accessory devices can have different sizes and/or shapes to accommodate different head and/or face structures. This can allow a user to choose from among multiple accessory devices that provide different ergonomic features so the user can select one according to comfort provided. By further example, different accessory devices can have different aesthetic features to provide the user with different options for fashion and appearance.

Additionally or alternatively, the weight and/or weight distribution of the accessory devices can be selected to enhance the experience and/or comfort of the user. For example, the accessory devices can be positioned at a portion of the arm to provide a counter-balance to the weight of certain components of the head-mountable device. One or more electronic components and/or non-electronic components of the accessory device can provide the desired weight so that the weight of the combined system is distributed in a manner that enhances the comfort of the user.

Figure 3:
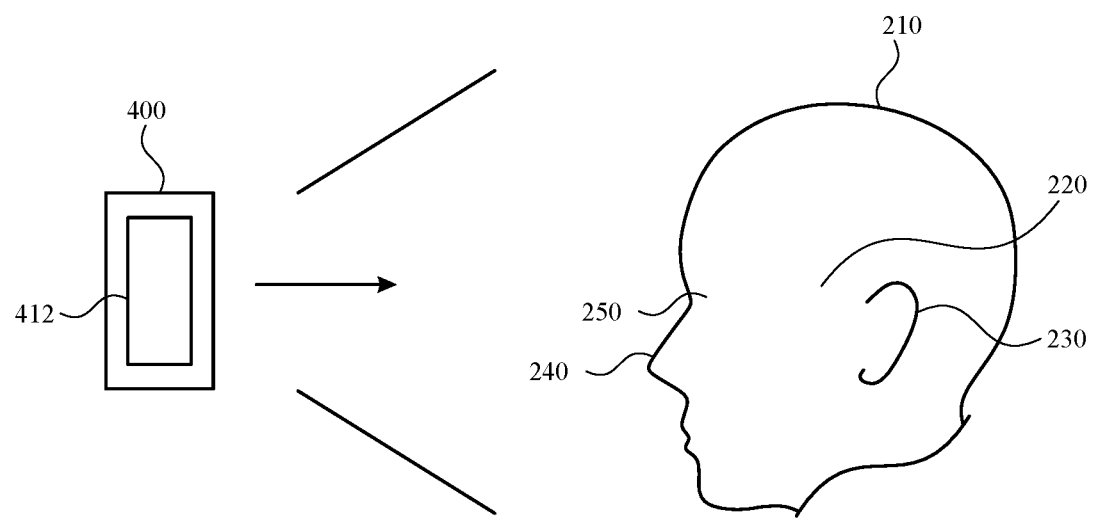
FIG. 3 illustrates a side view of an electronic device in use to measure features of a user, according to some embodiments of the present disclosure.

Referring now to FIG. 3, a device having a sensor can be operated to detect and/or measure one or more features of a head of a user. Such detections and measurements can be used to determine as assembly of a head-mountable device that will achieve a desired fit with respect to the head of the user.

As shown in FIG. 3, an electronic device 400 or another electronic device can provide a sensor 412 that is operable to measure distances to multiple regions of the face of a user 210. Such regions can include the regions that would be engaged by a frame and/or arms of a head-mountable device when the head-mountable device is worn by the user. For example, the regions can include one or both temples 220, one or both ears 230, a nose 240, and/or one or both eyes 250 of the user 210.

The sensor 412 can include one or more types of sensors. For example, the sensor 412 can include one or more image sensors, depth sensors, thermal (e.g., infrared) sensors, and the like. By further example, a depth sensor can be configured to measure a distance (e.g., range) to an object (e.g., region of the user's head) via stereo triangulation, structured light, time-of-flight, interferometry, and the like. Additionally or alternatively, the sensor and/or the device can capture and/or process an image based on one or more of hue space, brightness, color space, luminosity, and the like.

In FIG. 3, by way of example, the sensor 412 is depicted as a component of the electronic device 400. The electronic device 400 can be or operate in concert with a portable computing device, a tablet device, a laptop computer, a smartphone, a smart watch, or other appropriate devices that include one or more sensors. The electronic device 400 can be maintained at a fixed location with respect to the user 210, and/or the electronic device 400 can be moved to map different regions of the head of the user 210.

The sensor 412 can measure a distance from the sensor 412 to each of multiple regions of the head of the user 210. For example, the sensor 412 can measure one or more distances to one or both temples 220 of the user 210. Based on such measurements, the distance between the temples 220 can be calculated. Based on the measurements of the temples 220, features (e.g., shape, size, etc.) of the arms (e.g., temple components and/or earpieces) of a head-mountable device can be determined to accommodate the temples 220 of the user 210 while applying a desired amount of force on the temples 220 of the user 210 to secure the head-mountable device.

By further example, the sensor 412 can measure one or more distances to one or both ears 230 of the user 210. Based on such measurements, the location of each of the ears 230 can be determined. Based on the measurements of the ears 230, features (e.g., shape, size, etc.) of the arms (e.g., earpieces) of a head-mountable device can be determined to accommodate the ears 230 of the user 210 while applying a desired amount of force on the ears 230 of the user 210 to secure the head-mountable device.

By further example, the sensor 412 can measure one or more distances to the nose 240 of the user 210. Based on such measurements, the location, shape, size, and/or angle of the nose 240 can be calculated. Based on the measurements of the nose 240, features (e.g., shape, size, separation distance, angle, etc.) of the frame (e.g., one or more nosepieces at a bridge) of a head-mountable device can be determined to accommodate the nose 240 of the user 210.

By further example, the sensor 412 can measure a distance to one or both eyes 250 of the user 210. Based on such measurements, the distance between the eyes 250 (e.g., interpupillary distance) can be calculated. Based on the measurements of the eyes 250, features of the frame of a head-mountable device can be determined to accommodate the eyes 250 of the user 210, for example to place the optical modules at a desired location with respect to the eyes 250.

By further example, the sensor 412 can measure any other regions of the head, optionally including portions that are not to be directly engaged by the head-mountable device. Additionally or alternatively, one or multiple distance measurements can be made to each of various regions, such as with respect to multiple sections of one or both temples 220, one or both ears 230, the nose 240, and/or one or both eyes 250 of the user 210.

The sensor 412 can measure one or more contours of the user's face and/or head surfaces. Such measurements can be used to determine anchor surfaces of one or more portions of the head-mountable device, such as nosepieces, armpieces, earpieces, forehead pieces, and the like. By maximizing the surface area of such components, pressure on the user's face and/or head can be reduced and comfort can be increased. Additionally, the contours of such components can be formed to match the contours of the face to provide customizable and unique components to increase comfort.

Figure 4:
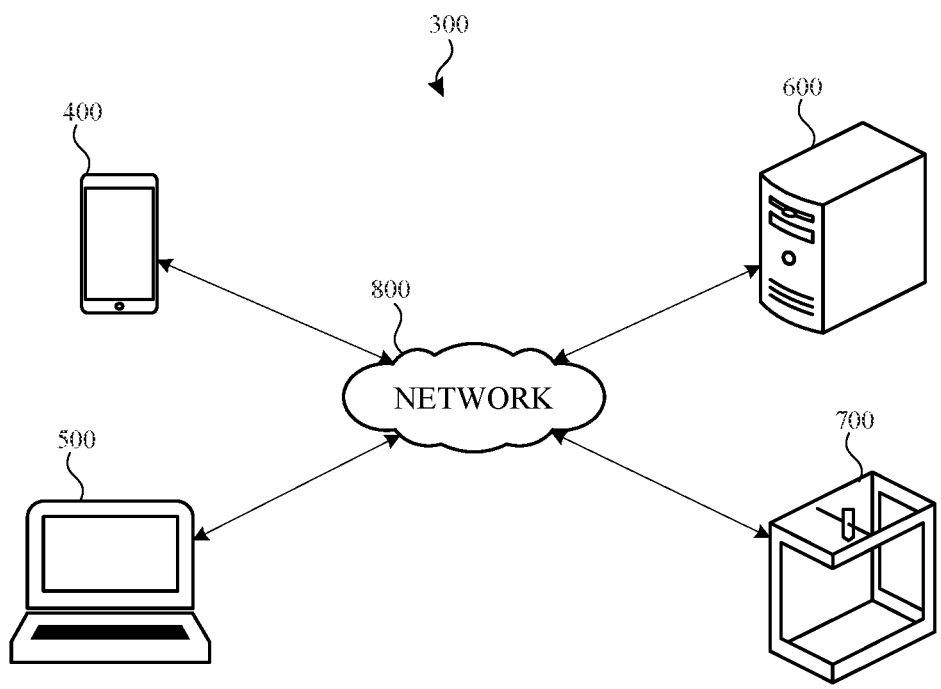
FIG. 4 illustrates a network environment for connected devices in accordance with one or more implementations.

FIG. 4 illustrates an example network environment in which an HMD assembly system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 4, a network environment 300 can include various devices, a network 800, and a server 600. The network 800 may communicatively couple, for example, the various devices to the server 600 and/or to each other. In one or more implementations, the network 800 may be an interconnected network of devices that may include, or may be communicatively coupled to, the Internet.

In some examples, the electronic device 400 can perform measurements, calculations, and/or determinations as disclosed herein. The electronic device 400 can output the results of such operations to another device within the network environment 300 (e.g., via the network 800), as described further herein.

As further shown in FIG. 4, the network environment 300 can further include an input device 500 that, along with the electronic device 400, can gather information that is used to determine a recommended assembly for a head-mountable device. For example, the input device 500 can receive input from a user. By further example, the input device 500 can include a point-of-sale station and/or device that is operable by the user or another person to perform a transaction for purchase and/or acquisition of a head-mountable device. For example, when the user has provided particular information, the user and/or another person can place an order or otherwise purchase the head-mountable device and/or corresponding equipment. The generation of an order and/or purchase can be based on the determinations made by the electronic device 400 and/or the input device 500.

The electronic device 400 and/or the input device 500 can provide a user interface for inputting information regarding a given user. The electronic device 400 and/or the input device 500 can include, for example, a touchscreen, keyboard, mouse, microphone, camera, and the like. The electronic device 400 and/or the input device 500 can present selectable elements (e.g., from a menu) or another input format (e.g., text, handwriting, and the like). The electronic device 400 and/or the input device 500 can also include output components, such as a display, speaker, haptic device, and the like. The electronic device 400 and/or the input device 500 can be operated by a user or another person to input information relating to the user's head features, personal information, vision correction needs, preferences, and the like. The user can optionally input the user's own information so that the information is not necessarily made available to another individual. Where the user provides preferences, such preferences can relate to implementation of the assembly of the head-mountable device. For example, the user can select color, shape, style, and/or other features of the head-mountable device. Such selections can be based on a set of available options.

As further shown in FIG. 4, the network environment 300 can further include an assembly system 700. The assembly system 700 can include one or more of various assembly mechanisms. For example, the assembly system 700 can include a 3D printing system, a stereolithography ("SLA") system, a selective laser sintering ("SLS") system, fused deposition modeling ("FDM") system, digital light processing ("DLP") system, and the like. The assembly system 700 can be one that is configured to produce a head-mountable device and/or components thereof based on instructions received, where the instructions are based on measurements, calculations, determinations, and/or user input, as described herein.

The electronic device 400, the input device 500, the server 600, and/or the assembly system 700 can include communication elements for communicating with each other. Such communication can be direct and/or indirect (e.g., via the network 800 and/or the server 600). The communication elements can include one or more wired or wireless communication elements, such as one or more universal serial bus (USB) interfaces, near-field communication (NFC) radios, wireless local area network (WLAN) radios, Bluetooth radios, Zigbee radios, cellular radios, and/or other wireless radios.

The server 600 may include one or more server devices that may facilitate a service being provided to a user, such as records relating to a detected features of a user (e.g., by the electronic device 400), selected preferences (e.g., as user input to the electronic device 400 and/or the input device 500), and/or an order fulfillment system.

Referring now to FIGS. 5-9, a head-mountable device can be assembled with an enclosure that surrounds a core component of the head-mountable device.

Figure 5:
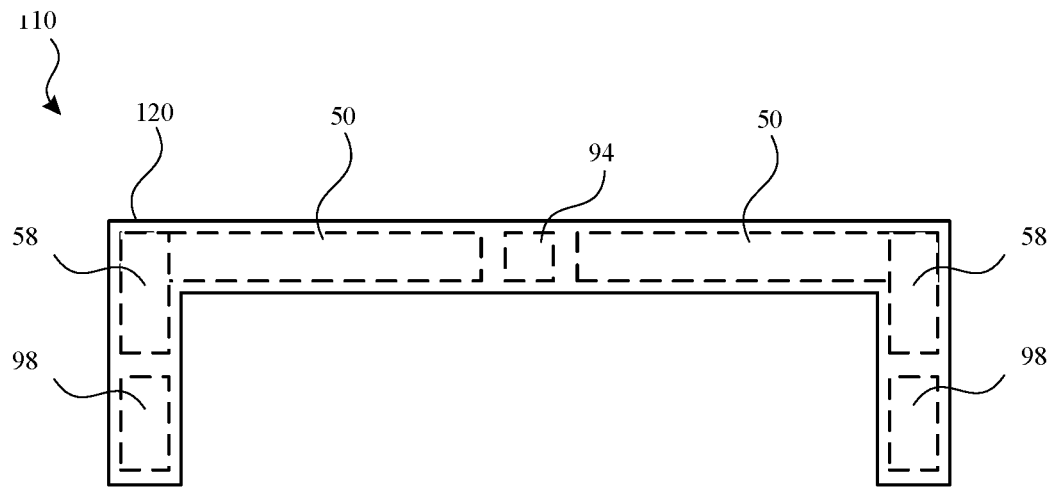
FIG. 5 illustrates a top view of a core component head-mountable device, according to some embodiments of the present disclosure.
Figure 6:
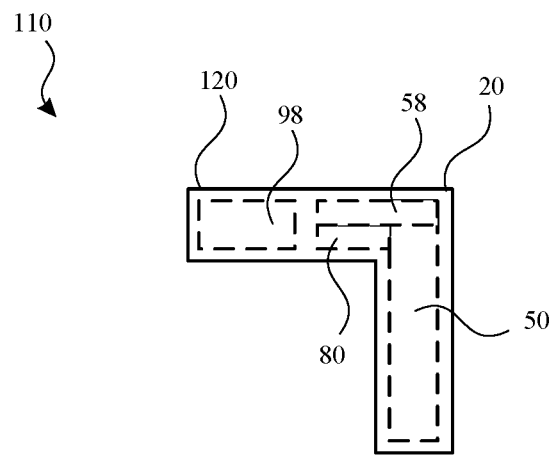
FIG. 6 illustrates a side view of the core component of FIG. 5, according to some embodiments of the present disclosure.

As shown in FIGS. 5 and 6, a core component 110 can form a base structure upon which other components of a head-mountable device can be assembled. The core component 110 can include various electronic components in a fixed arrangement relative to each other. For example, the core component 110 can include one or more of the components described herein, such as the display element 80, the optical module 50 (e.g., waveguide), the sensor 94, the camera 58, and/or other electronic components 98.

The core component 110 can include a stiff housing 120 that maintains the components contained therein in a fixed arrangement relative to each other. In some examples, the display element 80 (e.g., projector) can be maintained in a fixed position and/or orientation with respect to the optical module 50 (e.g., waveguide). Accordingly, the projector of the display element 80 can provide an output that produces visual elements on the waveguide of the optical module 50 at predictable locations for observation by a user.

In some examples, the camera 58 can be maintained in a fixed position and/or orientation with respect to the display element 80 and/or the optical module 50. Accordingly, images captured by the camera 58 can be processed by processor, and the display element 80 can provide an output that produces visual elements on the waveguide of the optical module 50 at known locations corresponding to the view of the external environment observed by the user. By maintaining the camera 58 in the fixed position and/or orientation, the visual elements can be produced in a reliable arrangement on the optical module.

In some examples, the sensor 94 can be maintained in a fixed position and/or orientation with respect to the stiff housing 120. For example, the sensor 94 can be operated to optically or otherwise detect the user's eyes. Where the sensor 94 is operated to detect the eyes and/or one or more other conditions of the user, the sensor 94 can provide reliable information regarding the detected conditions by maintaining a known and consistent location and/or orientation with respect to the user while the head-mountable device is worn by the user. Where the sensor 94 is operated to detect the one or more conditions of the head-mountable device, the sensor 94 can provide reliable information regarding the detected conditions by maintaining a known and consistent location and/or orientation with respect to the user while the head-mountable device is worn by the user. Accordingly, the conditions detected with respect to the head-mountable device can be correlated to the user when the head-mountable device 10 is worn by the user. Where the sensor 94 is operated to detect one or more external (e.g., environmental) conditions, the sensor 94 can provide reliable information regarding the detected conditions by maintaining a known and consistent location and/or orientation with respect to the user.

In some examples, the electronic components 98 can be maintained in a fixed position and/or orientation with respect to the stiff housing 120. For example, the electronic components 98 can include an output device, such as a speaker. Where the output device operates with directionality (e.g., directional speaker), the output device can be operated reliably when the position and/or orientation of the output device is maintained in a known and consistent location and/or orientation with respect to the user (e.g., ears) while the head-mountable device is worn by the user. By further example, the electronic components 98 can include an input device, such as a speaker. Where the input device operates with directionality (e.g., directional microphone), the input device can be operated reliably when the position and/or orientation of the input device is maintained in a known and consistent location and/or orientation with respect to the user (e.g., mouth) and/or environment while the head-mountable device is worn by the user.

Figure 7:
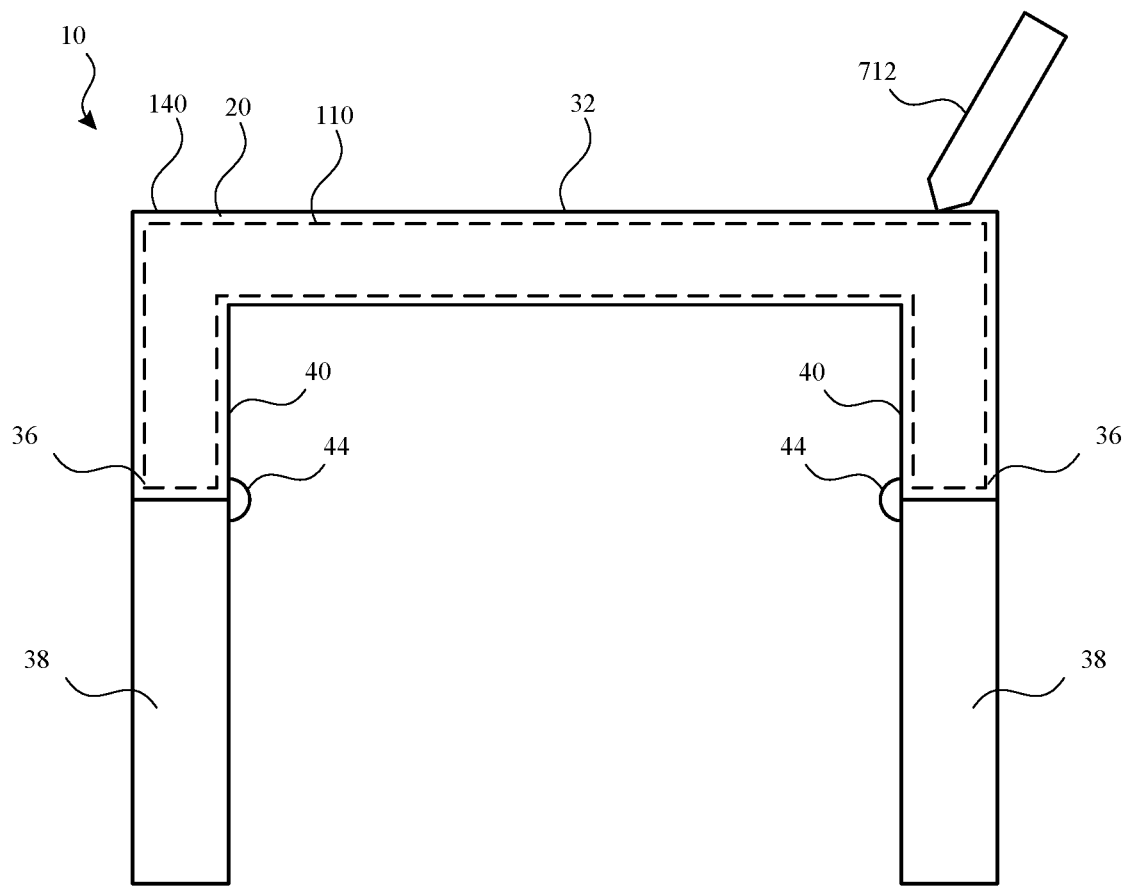
FIG. 7 illustrates a top view of a head-mountable device with the core component of FIGS. 5 and 6 and an enclosure, according to some embodiments of the present disclosure.
Figure 8:
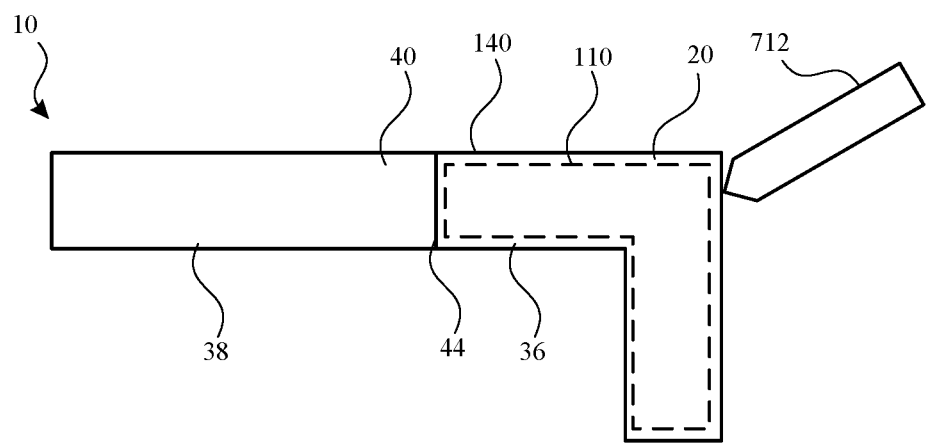
FIG. 8 illustrates a side view of the head-mountable device of FIG. 7, according to some embodiments of the present disclosure.

As shown in FIGS. 7 and 8, an enclosure 140 can be provided around at least a portion of the core component 110 to form the head-mountable device in an assembled configuration. The enclosure 140 can surround at least an outer periphery of a portion of the core component 110. As such, the enclosure 140 can form an outer periphery of the head-mountable device 10. For example, the enclosure 140 can form an outer periphery of the frame 20 and/or the arms 40, including the temple components 36 and/or the ear components 38. The core component 110 can extend within the enclosure 140 to form an inner portion of the frame and/or the arms 40. As shown in FIGS. 7 and 8, the core component 110 can extend to form portions of the temple components 36 of the arms 40. Optionally, the core component 110 need not extend to the ear components 38 of the arms 40. For example, the enclosure 140 can form an entirety of the ear components 38 extending from the hinges 44.

The core component 110 can provide a housing or other structure that is stiff to resist bending and/or flexing in response to forces applied to the head-mountable device 10. For example, as the head-mountable device 10 containing the core component 110 is placed on the head of the user and/or removed from the head of the user, the frame 20 and/or the arms 40 may tend to flex and/or bend. The enclosure 140 can absorb such forces by providing a structure that is more flexible than the core component 110 (e.g., the core component 110 can be stiffer than the enclosure 140). For example, the core component 110 can include a housing of a metal or other rigid material. By further example, the enclosure 140 can include a resin, plastic, elastic material, and/or polymer. Optionally, the enclosure 140 can include particles of conductive material to enhance thermal conductivity and promote dissipation of heat.

The selection of a core component 110 can be based on the measurements of the head features of the user and/or a user input. For example, a limited number of prefabricated core components can be available with a variety of known shapes and sizes. Certain features, such as interpupillary distance and vision correction needs of a user, can be used to determine the recommended selection from among the available core components for assembly.

The formation of an enclosure 140 can also be based on the measurements of the head features of the user and/or a user input. For example, whereas the core components 110 can be of a limited number of discrete shapes and/or sizes, any shape can be formed for the enclosure 140. Certain features, such as the locations of the nose, temples, and ears of the user, can be used to determine the recommended enclosure 140. Features of the recommended enclosure can include shapes that conform to the features of the user's head (e.g., where engagement occurs), size for distribution of forces (e.g., where engagement occurs), and placement of particular components (e.g., optical modules) at a desired location with respect to the user (e.g., eyes of the user).

As further shown in FIGS. 7 and 8, the enclosure 140 can be formed directly onto the core component 110. A printer element 712 and/or other element of an assembly system can be brought to the core component 110 to place and secure material thereon. The process can include placement, adhesion, fusion, and/or other processing to secure the material onto the core component 110.

It will be understood that the assembly process can be performed in one of a variety of sequences. For example, the core component 110 can be provided with or without electronic components assembled therein. At least a portion of the enclosure 140 can be formed before and/or after at least some of the electronic components are provided to the core component 110. One or more of a variety of printing techniques can be employed based on the target shape of the resulting head-mountable device and/or the different materials to be used. Additional processes can be employed, such as coating, finishing, and/or additional assembly steps beyond printing.

Figure 9:
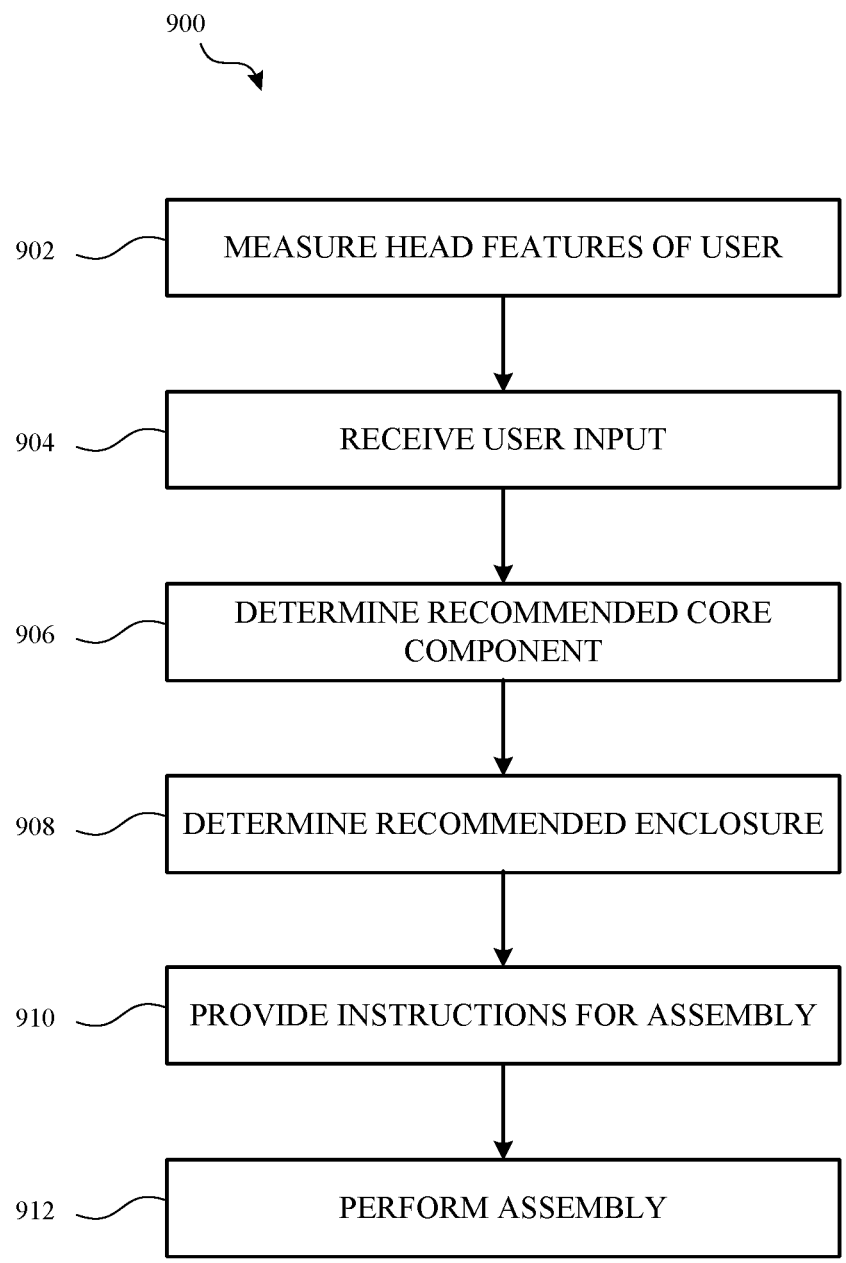
FIG. 9 illustrates a flow chart for a process having operations for determining and providing an output for assembly of a head-mountable device, according to some embodiments of the present disclosure.

FIG. 9 illustrates a flow diagram of an example process 900 for determining a recommended assembly. For explanatory purposes, the process 900 is primarily described herein with reference to the electronic device 400, the input device 500, and/or the assembly system 700. However, the process 900 is not limited to the electronic device 400, the input device 500, and/or the assembly system 700, and one or more blocks (or operations) of the process 900 may be performed by different components of the head-mountable device and/or one or more other devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The process 900 can begin when the electronic device detects a face of a user to measure features thereof (902). Such a detection can be made by one or more sensors of the electronic device. Additionally or alternatively, the detection can be performed in response to an operational state of the electronic device (e.g., on/off state, application launch, user input command, and the like). A sensor of the electronic device can measure one or more distances to one or more regions of the face. Such regions can include one or both temples, one or both ears, a nose, and/or one or both eyes of the user.

The electronic device and/or another device (e.g., input device) can receive a user input. Such an input can include a selection of one or more features that influence assembly. For example, the user can select a color, shape, style, and/or other features of the head-mountable device to be assembled.

Based on the measured distances and/or the user input, the electronic device and/or another device can determine a recommended core component for a head-mountable device (906). For example, a limited number of prefabricated core components can be available with a variety of known shapes and sizes. Certain features, such as interpupillary distance and vision correction needs of a user, can be used to determine the recommended selection from among the available core components for assembly. It will be understood that the available core components can be prefabricated components, and that limited customization may be offered solely by the availability of core components alone.

Based on the measured distances and/or the user input, as well as the recommended core component, the electronic device and/or another device can determine a recommended enclosure for a head-mountable device (908). For example, the measured distances to the features of the user's head can be considered to determine how to the enclosure can position the core component at a desired position and/or orientation with respect to the user while the head-mountable device is worn by the user. In particular, the recommended enclosure can be one that includes shapes that conform to the features of the user's head (e.g., where engagement occurs), size for distribution of forces (e.g., where engagement occurs), and placement of particular components (e.g., optical modules) at a desired location with respect to the user (e.g., eyes of the user). It will be further understood that, unlike the core component, any shape and/or size within certain ranges can be made available by custom printing the enclosure.

Based on the recommended core component and/or enclosure, the electronic device and/or another device (e.g., input device) can provide instructions for assembly of the head-mountable device (910). Specifically, the instructions can include an indication of a core component for selection and an enclosure for formation on the core component. The instructions can be provided as an output, such as a signal or transmission of a record (e.g., via a network) to an assembly system.

Based on the instructions, an assembly system can perform the assembly of the head-mountable device (912). The assembly can include providing the core component and forming the enclosure thereon, as described herein.

Referring now to FIGS. 10-13, a head-mountable device can be assembled with fitting components that extend from a frame and/or arms of the head-mountable device.

Figure 10:
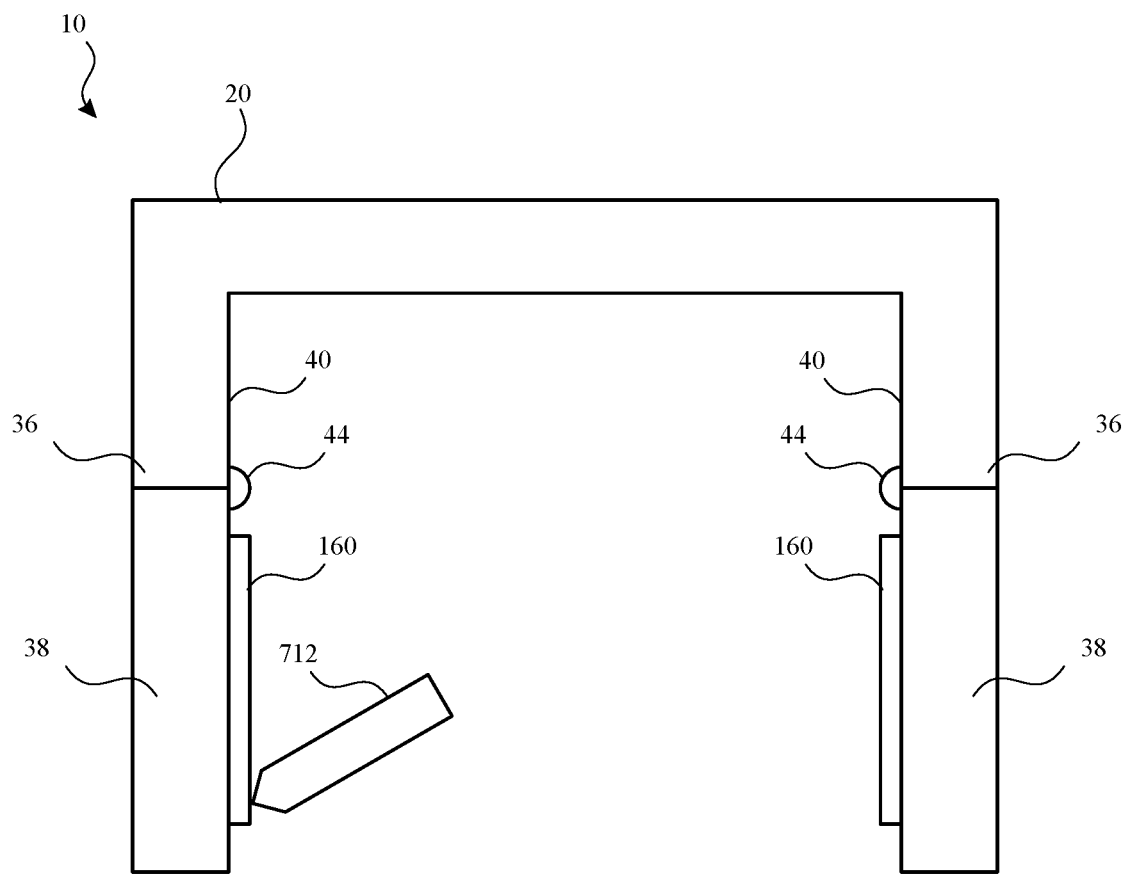
FIG. 10 illustrates a top view of a head-mountable device with an armpiece at an arm, according to some embodiments of the present disclosure.
Figure 11:
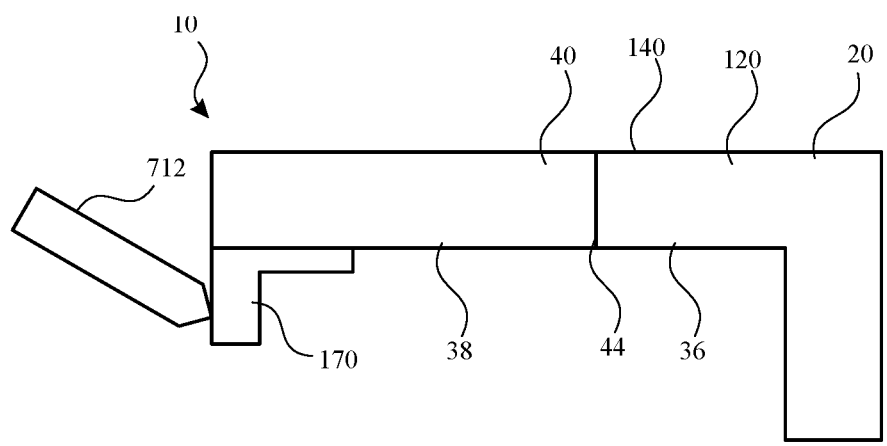
FIG. 11 illustrates a side view of a head-mountable device with an earpiece at an arm, according to some embodiments of the present disclosure.
Figure 12:
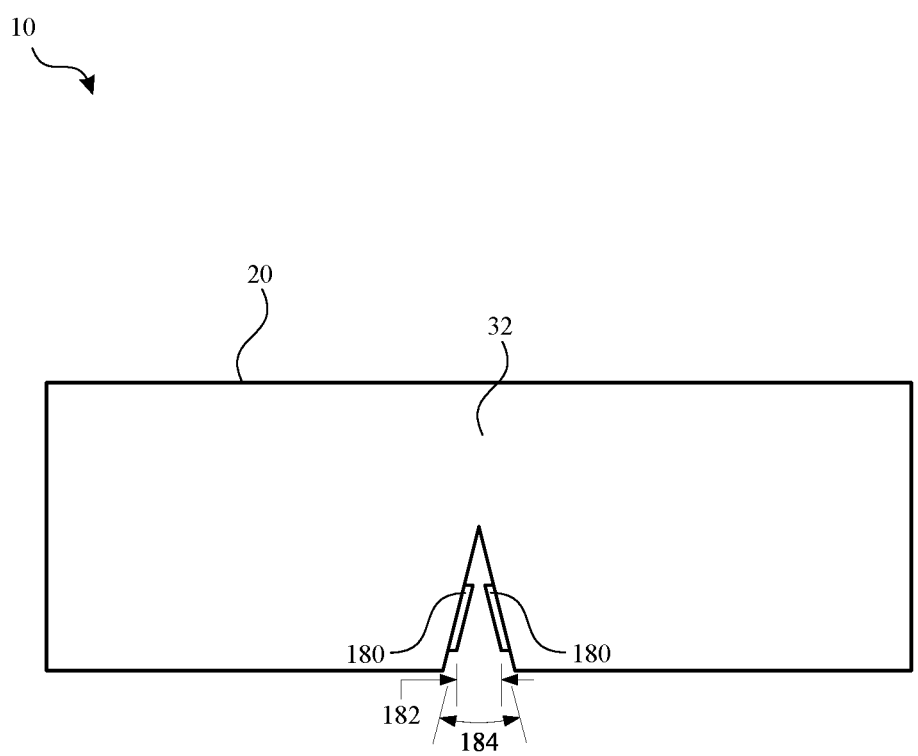
FIG. 12 illustrates a front view of a head-mountable device with nosepiece at a bridge, according to some embodiments of the present disclosure.

As shown in FIGS. 10-12, one or more fitting components can be provided to engage features of a head of a user when the head-mountable device 10 is worn by the user. The frame 20 and/or the arms 40 of the head-mountable device 10 can provide a base structure upon which the fitting components can be assembled. The frame 20 and/or the arms 40 can be custom assembled as parts of the enclosure around a core component, as described herein with respect to FIGS. 5-9. Alternatively, the frame 20 and/or the arms 40 can be selected from a limited number of prefabricated head-mountable devices available with a variety of known shapes and sizes.

As shown in FIG. 10, one or more fitting components can be formed as armpieces 160 on the arms 40 of the head-mountable device 10 in an assembled configuration. The armpieces 160 can extend from the arms 40 toward the head of the user for engagement therewith. For example, each of the armpieces 160 can extend from an inner side of one of the arms 40 toward the other one of the arms 40. As shown in FIG. 10, the armpieces 160 can extend to form portions of the ear components 38 of the arms 40. Additionally or alternatively, the armpieces 160 can extend to form portions of the temple components 36 of the arms 40. Optionally, the armpieces 160 can include a resin, plastic, elastic material, and/or polymer.

The formation of the armpieces 160 can be based on the measurements of the head features of the user and/or a user input. For example, a limited number of base head-mountable devices can be available with a variety of known shapes and sizes. The formation of the armpieces 160 can be based on the measurements of the head features, such as the locations of the temples and/or ears of the user. Features of the armpieces 160 can include shapes that conform to the features of the user's temples or other features (e.g., where engagement occurs), size for distribution of forces (e.g., where engagement occurs), and placement of particular components (e.g., optical modules) at a desired location with respect to the user (e.g., eyes of the user). While the armpieces 160 of FIG. 10 are shown schematically with a particular shape and size, it will be understood that the armpieces 160 can have a size and shape that accommodates the hear of the user wearing the head-mountable device 10.

As further shown in FIG. 10, the armpieces 160 can be formed directly onto the arms 40. A printer element 712 and/or other element of an assembly system can be brought to the arms 40 to place and secure material thereon.

As shown in FIG. 11, one or more one or more fitting components can be formed as earpieces 170 on the arms 40 of the head-mountable device 10 in an assembled configuration. The earpieces 170 can extend from the arms 40 along the head and/or toward the ears of the user for engagement therewith. For example, each of the earpieces 170 can extend from a lower side of one of the arms 40. As shown in FIG. 11, the earpieces 170 can extend to form portions of the ear components 38 of the arms 40. Additionally or alternatively, the earpieces 170 can extend to form portions of the temple components 36 of the arms 40. Optionally, the earpieces 170 can include a resin, plastic, elastic material, and/or polymer.

The formation of the earpieces 170 can be based on the measurements of the head features of the user and/or a user input. For example, a limited number of base head-mountable devices can be available with a variety of known shapes and sizes. The formation of the earpieces 170 can be based on the measurements of the head features, such as the locations of the ears of the user. Features of the earpieces 170 can include shapes that conform to the features of the user's ears or other features (e.g., where engagement occurs), size for distribution of forces (e.g., where engagement occurs), and placement of particular components (e.g., optical modules) at a desired location with respect to the user (e.g., eyes of the user). While the earpieces 170 of FIG. 11 are shown schematically with a particular shape and size, it will be understood that the earpieces 170 can have a size and shape that accommodates the ears of the user wearing the head-mountable device 10. In particular, the distance to which they extend from the arms 40 and the curvature can match the location and shape of the ear.

As further shown in FIG. 11, the earpieces 170 can be formed directly onto the arms 40. A printer element 712 and/or other element of an assembly system can be brought to the arms 40 to place and secure material thereon. Optionally, the earpieces can be provided as and/or with an accessory component, such as the accessory component 198 shown in FIG. 2.

As shown in FIG. 12, one or more one or more fitting components can be formed as nosepieces 180 on the frame 20 of the head-mountable device 10 in an assembled configuration. The nosepieces 180 can extend from the frame 20 toward the nose of the user for engagement therewith. For example, each of the nosepieces 180 can extend from a side of a concave region of the frame 20 toward the other side of the concave region. Optionally, the nosepieces 180 can include a resin, plastic, elastic material, and/or polymer.

The formation of the nosepieces 180 can be based on the measurements of the head features of the user and/or a user input. For example, a limited number of base head-mountable devices can be available with a variety of known shapes and sizes. The formation of the nosepieces 180 can be based on the measurements of the head features, such as the locations of the nose. For example, the angle 184 formed by the nosepieces 180 and/or the gap 182 between the nosepieces 180 can be based on measurements of the nose of the user. Features of the nosepieces 180 can include shapes that conform to the features of the user's nose (e.g., where engagement occurs), size for distribution of forces (e.g., where engagement occurs), and placement of particular components (e.g., optical modules) at a desired location with respect to the user (e.g., eyes of the user).

As further shown in FIG. 12, the nosepieces 180 can be formed directly onto the frame 20 or optionally with an intervening structure. A printer element and/or other element of an assembly system can be brought to the frame 20 to place and secure material thereon.

Figure 13:
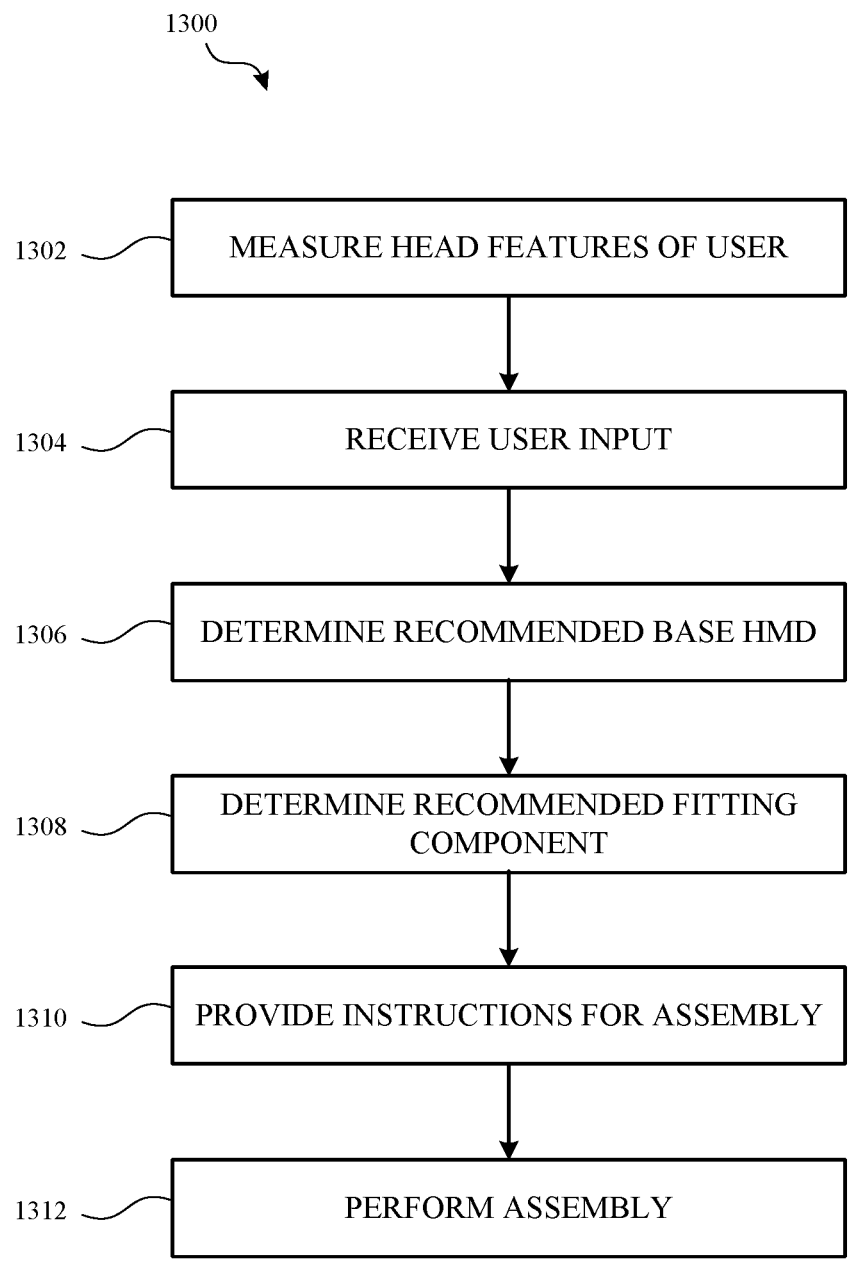
FIG. 13 illustrates a flow chart for a process having operations for determining and providing an output for assembly of a head-mountable device, according to some embodiments of the present disclosure.

FIG. 13 illustrates a flow diagram of an example process 1300 for determining a recommended assembly. For explanatory purposes, the process 1300 is primarily described herein with reference to the electronic device 400, the input device 500, and/or the assembly system 700. However, the process 1300 is not limited to the electronic device 400, the input device 500, and/or the assembly system 700, and one or more blocks (or operations) of the process 1300 may be performed by different components of the head-mountable device and/or one or more other devices. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

The process 1300 can begin when the electronic device detects a face of a user to measure features thereof (1302). Such a detection can be made by one or more sensors of the electronic device. Additionally or alternatively, the detection can be performed in response to an operational state of the electronic device (e.g., on/off state, application launch, user input command, and the like). A sensor of the electronic device can measure one or more distances to one or more regions of the face. Such regions can include one or both temples, one or both ears, a nose, and/or one or both eyes of the user.

The electronic device and/or another device (e.g., input device) can receive a user input. Such an input can include a selection of one or more features that influence assembly. For example, the user can select a color, shape, style, and/or other features of the head-mountable device to be assembled.

Based on the measured distances and/or the user input, the electronic device and/or another device can determine a recommended base head-mountable device (1306). For example, a limited number of head-mountable device can be available with a variety of known shapes and sizes. Certain features, such as interpupillary distance and vision correction needs of a user, can be used to determine the recommended selection from among the available head-mountable devices for assembly. It will be understood that the available head-mountable devices can be prefabricated, and that limited customization may be offered solely by the availability of core components alone.

Based on the measured distances and/or the user input, as well as the recommended base head-mountable device, the electronic device and/or another device can determine a recommended fitting component for a head-mountable device (1308). For example, the measured distances to the features of the user's head can be considered to determine how to the fitting components can position the base head-mountable device at a desired position and/or orientation with respect to the user while the assembled head-mountable device is worn by the user. In particular, the recommended fitting components can be those that include shapes that conform to the features of the user's head (e.g., where engagement occurs), size for distribution of forces (e.g., where engagement occurs), and placement of particular components (e.g., optical modules) at a desired location with respect to the user (e.g., eyes of the user). It will be further understood that, unlike the base head-mountable device, any shape and/or size within certain ranges can be made available by custom printing the fitting components.

Based on the recommended base head-mountable device and/or fitting component(s), the electronic device and/or another device (e.g., input device) can provide instructions for assembly of the head-mountable device (1310). Specifically, the instructions can include an indication of a base head-mountable device for selection and fitting component(s) for formation on the base head-mountable device. The instructions can be provided as an output, such as a signal or transmission of a record (e.g., via a network) to an assembly system.

Based on the instructions, an assembly system can perform the assembly of the head-mountable device (1312). The assembly can include providing the base head-mountable device and forming the fitting component(s) thereon, as described herein.

Figure 14:
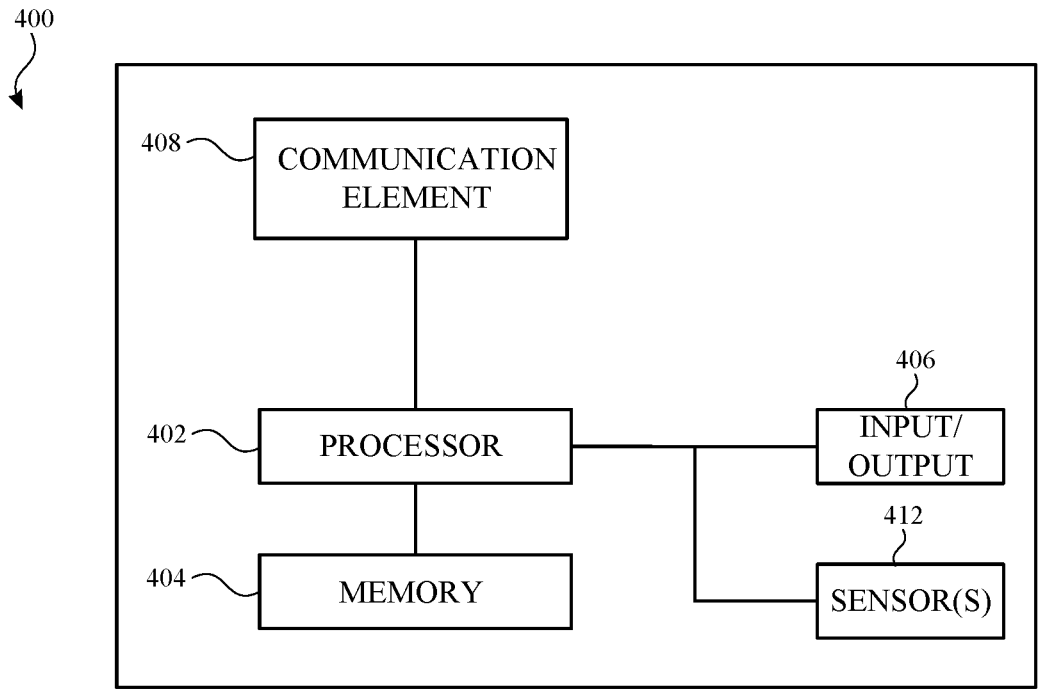
FIG. 14 illustrates a block diagram of an electronic device, in accordance with some embodiments of the present disclosure.

Referring now to FIG. 14, components of the electronic device can be provided and operatively connected to achieve the performance described herein. FIG. 14 shows a simplified block diagram of an electronic device 400 in accordance with one or more embodiments of the disclosure. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 400 may include, among other components, a processor 402, a memory 404, one or more input/output devices 406, a communication element 408, and/or one or more sensors 412.

The processor 402, which may also be referred to as an application processor or a processor, may include suitable logic, circuitry, and/or code that enable processing data and/or controlling operations of the electronic device 400. In this regard, the processor 402 may be enabled to provide control signals to various other components of the electronic device 400. The processor 402 may also control transfers of data between various portions of the electronic device 400. Additionally, the processor 402 may enable implementation of an operating system or otherwise execute code to manage operations of the electronic device 400. The memory 404 may include suitable logic, circuitry, and/or code that enable storage of various types of information such as received data, generated data, code, and/or configuration information. The memory 404 may include, for example, random access memory (RAM), read-only memory (ROM), flash, and/or magnetic storage.

The communication element 408 may include suitable logic, circuitry, and/or code that enables wired or wireless communication. The communication element 408 of any given device can providing a communication link with the communication element of any other device. Such communication can be direct or indirect (e.g., through an intermediary). The communication element 408 may include, for example, one or more of a Bluetooth communication element, an NFC interface, a Zigbee communication element, a WLAN communication element, a USB communication element, or generally any communication element.

The one or more sensors 412 may include, for example, one or more image sensors, one or more depth sensors, one or more infrared sensors, one or more thermal (e.g., infrared) sensors, and/or generally any sensors that may be used to detect and/or measure lenses or a user.

Figure 15:
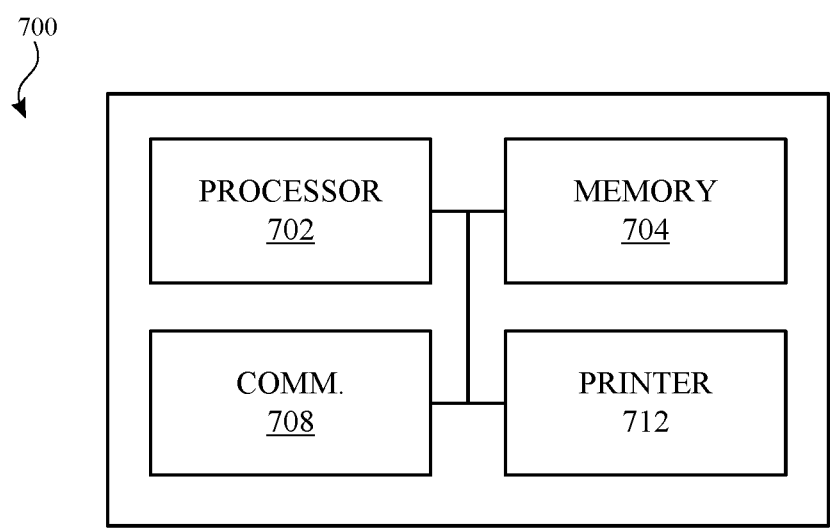
FIG. 15 illustrates a block diagram of an assembly system, in accordance with some embodiments of the present disclosure.

Referring now to FIG. 15, components of the assembly system can be provided and operatively connected to achieve the performance described herein. FIG. 15 shows a simplified block diagram of an assembly system 700 in accordance with one or more embodiments of the disclosure. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The assembly system 700 may include, among other components, a processor 702, a memory 704, a communication element 708, and/or a printer element 712.

The processor 702, which may also be referred to as an application processor or a processor, may include suitable logic, circuitry, and/or code that enable processing data and/or controlling operations of the assembly system 700. The processor 702 can have one or more of the features of any other processor described herein. The memory 704 can have one or more of the features of any other memory described herein.

The communication element 708 may include suitable logic, circuitry, and/or code that enables wired or wireless communication. The communication element 708 can have one or more of the features of any other communication element described herein.

The assembly system 700 may include a printer element 712 that controllably forms an enclosure, fitting component, or other structure for a head-mountable device. The printer element 712 can include or operate in concert with a materials dispenser, heater, fusion element, and the like to provide, manipulate, and/or secure material to a structure. The printer element 712 can include one or more components of a 3D printing system, a stereolithography ("SLA") system, a selective laser sintering ("SLS") system, fused deposition modeling ("FDM") system, digital light processing ("DLP") system.

Figure 16:
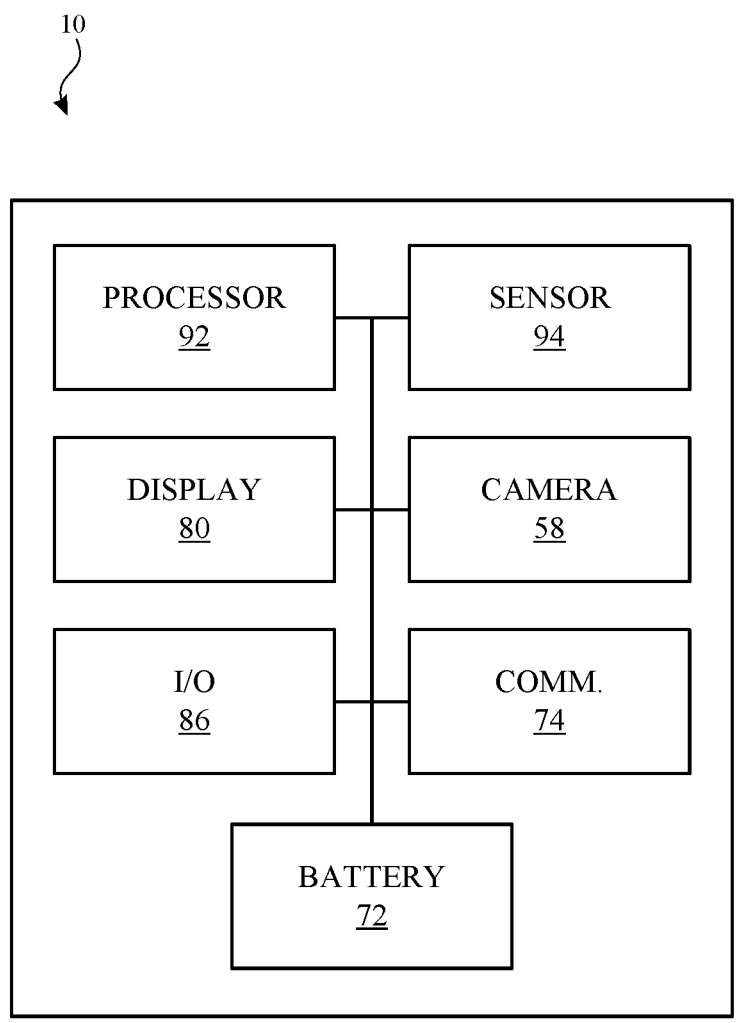
FIG. 16 illustrates a block diagram of a head-mountable device, in accordance with some embodiments of the present disclosure.

Referring now to FIG. 16, components of the head-mountable device can be provided and operatively connected to achieve the performance described herein. FIG. 16 shows a simplified block diagram of a head-mountable device 10 in accordance with one or more embodiments of the disclosure. It will be appreciated that components described herein, as well as other components, can be provided on either or both of a frame and/or one or more arms of the head-mountable device 10. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 16, the head-mountable device 10 can include a processor 92 with one or more processing units that include or are configured to access a memory having instructions stored thereon.

The head-mountable device 10 can include a communication element 74 for communicating with one or more servers or other devices using any suitable communications protocol. The communication element 74 can have one or more of the features of any other communication element described herein.

The head-mountable device 10 can further include a display element 80 for displaying visual information for a user, one or more sensors 94, a camera 58, as described herein.

The head-mountable device 10 can include one or more other components for supporting operations thereof. For example, the head-mountable device 10 can include a battery 72, which can charge and/or power components of the head-mountable device 10. The battery can also charge and/or power components connected to the head-mountable device 10. By further example, the head-mountable device 10 can include an input/output component 86, which can include any suitable component for allowing a user to provide input and/or receive output. The input/output component 86 can include, for example, one or more buttons, crowns, keys, dials, trackpads, microphones, speakers, haptic devices, and the like.

Accordingly, embodiments of the present disclosure provide a head-mountable device with custom components that are assembled onto core components to provide custom fit capabilities when assembled together. By detecting head features of a user, a custom assembly for a head-mountable device can be determined to achieve a preferred fit. The custom assembly can be based on a predetermined base design and augmentations that will allow the user to operate the elements of the base design while also enjoying a preferred fit. For example, a core component holding certain components (e.g., electric components) in fixed relative positions can be augmented with an enclosure and/or fitting components to accommodate the head features of a given user.

Various examples of aspects of the disclosure are described below as clauses for convenience. These are provided as examples, and do not limit the subject technology.

Clause A: an electronic device comprising: a sensor configured to measure distances from the sensor to head features of a user; and a processor configured to: determine, based on the distances, a recommended core component housing electronic components; determine, based on the distances and the recommended core component, a recommended enclosure for surrounding the recommended core component and engaging the head features of the user when the user wears a head-mountable device, the recommended enclosure forming a frame and arms extending from the frame; and provide an output comprising instructions to assemble the head-mountable device with the recommended core component and the recommended enclosure.

Clause B: a method comprising: determining, with a sensor of an electronic device, distances from the sensor to head features of a user; selecting, based on the distances, a core component of a head-mountable device, the core component housing in fixed relative positions: a camera; a waveguide; and a display element operable to provide visual elements on the waveguide based on images captured by the camera; and forming, based on the distances, an enclosure surrounding the core component, the enclosure being more flexible than the core components and forming: a frame for engaging a nose of the user when the user wears the head-mountable device; and arms extending from the frame and for engaging ears of the user when the user wears the head-mountable device.

Clause C: an electronic device comprising: a depth sensor configured to measure distances from the depth sensor to head features of a user; and a processor configured to: determine, based on the distances, a recommended enclosure comprising a frame, arms, and an electronic component; determine, based on the distances and the recommended enclosure, a recommended fitting component for extending from the recommended enclosure and engaging the head features of the user when the user wears a head-mountable device; and provide an output comprising instructions to assemble the head-mountable device the recommended fitting component extending from the enclosure.

One or more of the above clauses can include one or more of the features described below. It is noted that any of the following clauses may be combined in any combination with each other, and placed into a respective independent clause, e.g., Clause A, B, or C.

Clause 1: the electronic components comprise: a camera supported by the recommended core component; a waveguide supported by the recommended core component; a display element within the recommended core component; and an HMD processor configured to operate the display element to provide visual elements on the waveguide based on images captured by the camera.

Clause 2: the distances comprise: a distance to a temple of the user; a distance to an ear of the user; and a distance to a nose of the user; and the enclosure has a shape corresponding to the distance to the temple, the distance to the ear, and the distance to the nose.

Clause 3: the distances comprise a distance between eyes of the user; the recommended core component has a shape corresponding to the distance between eyes of the user.

Clause 4: the recommended core component comprises a structure that maintains the electronic components in fixed positions with respect to each other.

Clause 5: the recommended enclosure is more flexible than the recommended core component.

Clause 6: each of the arms of the enclosure comprises: a temple component surrounding a portion of the recommended core component; and an ear component coupled to the temple component by a hinge.

Clause 7: an input device configured to provide a user interface for receiving a user input, wherein the recommended enclosure is determined further based on the user input.

Clause 8: the electronic device further comprises a communication element, wherein the output is provided by transmitting the instructions to an assembly system.

Clause 9: the sensor comprises: a depth sensor, an image sensor, or an infrared sensor.

Clause 10: the distances comprise: a distance to a temple of the user; a distance to an ear of the user; and a distance to a nose of the user; and the enclosure has a shape corresponding to the distance to the temple, the distance to the ear, and the distance to the nose.

Clause 11: the distances comprise a distance between eyes of the user; and the core component has a shape corresponding to the distance between eyes of the user.

Clause 12: receiving a user input from an interface of the electronic device, wherein the enclosure is formed based on the user input.

Clause 13: the distances comprise a distance to a temple of the user; and the recommended fitting component comprises an armpiece extending from one of the arms towards the other one of the arms.

Clause 14: the distances comprise a distance to an ear of the user; and the recommended fitting component comprises an earpiece extending from one of the arms.

Clause 15: the distances comprise a distance to a nose of the user; and the recommended fitting component comprises a nosepiece extending from the frame.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device comprising:
    a sensor configured to measure distances from the sensor to head features of a user; and
    a processor configured to:
        select, based on the distances and from multiple prefabricated core components, a recommended core component housing multiple electronic components in fixed relative positions with respect to each other, the recommended core component comprising a rigid material, the recommended core component extending alongside each of a pair of optical modules and connecting the optical modules to each other, each of the optical modules comprising a lens;
        determine, based on the distances and the recommended core component, a recommended enclosure to be 3D printed on all outer surfaces of and in a position surrounding the recommended core component and engaging the head features of the user when the user wears a head-mountable device, the recommended enclosure forming an outer periphery of a frame and arms extending from the frame, the recommended core component forming an inner portion of the frame, the recommended enclosure being of an enclosure material forming the frame and the arms, the enclosure material being more flexible than the rigid material of the recommended core component; and
        provide an output comprising instructions to assemble the head-mountable device with the recommended core component and the recommended enclosure.

2. The electronic device of claim 1, wherein the electronic components comprise:
    a camera supported by the recommended core component;
    a waveguide supported by the recommended core component;
    a display element within the recommended core component; and
    an HMD processor configured to operate the display element to provide visual elements on the waveguide based on images captured by the camera.

3. The electronic device of claim 1, wherein:
    the distances comprise:
        a distance to a temple of the user;
        a distance to an ear of the user; and
        a distance to a nose of the user; and
    the recommended enclosure has a shape corresponding to the distance to the temple, the distance to the ear, and the distance to the nose.

4. The electronic device of claim 1, wherein:
    the distances comprise a distance between eyes of the user;
    the recommended core component has a shape corresponding to the distance between eyes of the user.

5. The electronic device of claim 1, wherein the recommended core component comprises a structure that maintains the electronic components in fixed positions with respect to each other.

6. The electronic device of claim 5, wherein the recommended enclosure is more flexible than the recommended core component.

7. The electronic device of claim 1, wherein each of the arms of the recommended enclosure comprises:
    a temple component surrounding a portion of the recommended core component; and
    an ear component coupled to the temple component by a hinge.

8. The electronic device of claim 1, further comprising an input device configured to provide a user interface for receiving a user input, wherein the recommended enclosure is determined further based on the user input.

9. The electronic device of claim 1, wherein the electronic device further comprises a communication element, wherein the output is provided by transmitting the instructions to an assembly system.

10. The electronic device of claim 1, wherein the sensor comprises: a depth sensor, an image sensor, or an infrared sensor.

11. A method comprising:
    determining, with a sensor of an electronic device, distances from the sensor to head features of a user;
    selecting, based on the distances, a core component of a head-mountable device, the core component comprising a rigid material, the core component housing in fixed relative positions:
        a camera;
        a pair of lenses, the core component extending alongside each of the lenses and connecting the lenses to each other;
        a waveguide; and
        a display element operable to provide visual elements on the waveguide based on images captured by the camera; and
    3D printing, based on the distances, an enclosure surrounding the core component on all outer surfaces of the core component, the enclosure being of an enclosure material that is more flexible than the rigid material of the core component and forming:
        an outer periphery of a frame for engaging a nose of the user when the user wears the head-mountable device, the core component forming an inner portion of the frame; and
        arms extending from the frame and for engaging ears of the user when the user wears the head-mountable device.

12. The method of claim 11, wherein:
    the distances comprise:
        a distance to a temple of the user;
        a distance to an car of the user; and
        a distance to a nose of the user; and the enclosure has a shape corresponding to the distance to the temple, the distance to the ear, and the distance to the nose.

13. The method of claim 11, wherein:

the distances comprise a distance between eyes of the user; and the core component has a shape corresponding to the distance between eyes of the user.

14. The method of claim 11, further comprising receiving a user input from an interface of the electronic device, wherein the enclosure is formed based on the user input.

15. An electronic device comprising:

a depth sensor configured to measure distances from the depth sensor to head features of a user; and a processor configured to:

select, based on the distances, a recommended core component housing multiple electronic components in fixed relative positions with respect to each other, the recommended core component comprising a rigid material, the recommended core component extending alongside each of a pair of optical modules and connecting the optical modules to each other, each of the optical modules comprising a lens;

determine, based on the distances, a recommended enclosure being of an enclosure material being more flexible than the rigid material of the recommended core component, the enclosure material being 3D printed to form:

an outer periphery of a frame, the outer periphery surrounding all outer surfaces of the recommended core component, the recommended core component forming an inner portion of the frame; and arms extending from the frame;

determine, based on the distances and the recommended enclosure, a recommended fitting component for extending from the recommended enclosure and engaging the head features of the user when the user wears a head-mountable device; and provide an output comprising instructions to assemble the head-mountable device with the recommended fitting component extending from the recommended enclosure.

16. The electronic device of claim 15, further comprising an input device configured to provide a user interface for receiving a user input, wherein the recommended enclosure is determined further based on the user input.

17. The electronic device of claim 15, wherein the electronic device further comprises a communication element, wherein the output is provided by transmitting the instructions to an assembly system.

18. The electronic device of claim 15, wherein:

the distances comprise a distance to a temple of the user; and the recommended fitting component comprises an armpiece extending from one of the arms towards the other one of the arms.

19. The electronic device of claim 15, wherein:

the distances comprise a distance to an ear of the user; and the recommended fitting component comprises an earpiece extending from one of the arms.

20. The electronic device of claim 15, wherein:

the distances comprise a distance to a nose of the user; and the recommended fitting component comprises a nosepiece extending from the frame.

\* \* \* \* \*

UNITED STATES PATENT AND TRADEMARK OFFICE
CERTIFICATE OF CORRECTION

PATENT NO. : 12,360,403 B1
APPLICATION NO. : 17/721080
DATED : July 15, 2025
INVENTOR(S) : Austin S. Young Page 1 of 1

It is certified that error appears in the above-identified patent and that said Letters Patent is hereby corrected as shown below:

In the Claims

Column 26; Line 66 (Claim 12): Replace "an car of" with --an ear of--.

Signed and Sealed this
Twenty-eighth Day of October, 2025

John A. Squires
*Director of the United States Patent and Trademark Office*